(12) United States Patent
Gou et al.

(10) Patent No.: US 12,125,125 B2
(45) Date of Patent: Oct. 22, 2024

(54) METHOD AND DEVICE FOR TEXT-BASED IMAGE GENERATION

(71) Applicant: Ping An Technology (Shenzhen) Co., Ltd., Shenzhen (CN)

(72) Inventors: Yuchuan Gou, Sunnyvale, CA (US); Qiancheng Wu, Berkeley, CA (US); Minghao Li, Mountain View, CA (US); Bo Gong, Belmont, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 661 days.

(21) Appl. No.: 17/344,484

(22) Filed: Jun. 10, 2021

(65) Prior Publication Data
US 2022/0005235 A1    Jan. 6, 2022

Related U.S. Application Data

(60) Provisional application No. 63/048,505, filed on Jul. 6, 2020.

(51) Int. Cl.
*G06K 9/62*  (2022.01)
*G06F 18/213*  (2023.01)
(Continued)

(52) U.S. Cl.
CPC ............ *G06T 11/00* (2013.01); *G06F 18/213* (2023.01); *G06F 40/126* (2020.01); *G06F 40/20* (2020.01);
(Continued)

(58) Field of Classification Search
CPC ...... G06F 16/35; G06F 16/353; G06F 16/355; G06F 18/20; G06F 18/21; G06F 18/213; G06F 18/214; G06F 18/217; G06F 18/23; G06F 18/24; G06F 18/25; G06F 18/251; G06F 18/253; G06F 18/254; G06F 18/28; G06F 40/10; G06F 40/126; G06F 40/20; G06F 40/279; G06F 40/289; G06F 40/30; G06T 7/10; G06T 7/11; G06T 7/187;
(Continued)

(56) References Cited

U.S. PATENT DOCUMENTS 10,699,161 B2 *  6/2020  Malur Srinivasan .. G06V 10/82
10,713,821 B1 *  7/2020  Surya ..................... G06N 3/045
(Continued)

OTHER PUBLICATIONS

Minfeng Zhu, Pingbo Pan, Wei Chen, Yi Yang, "DM-GAN: Dynamic Memory Generative Adversarial Networks for Text-to-Image Synthesis", arXiv, arXiv:1904.01310v1, Apr. 2019, pp. 1-9 (Year: 2019).*

(Continued)

*Primary Examiner* — Eric Rush
(74) *Attorney, Agent, or Firm* — Anova Law Group, PLLC

(57) ABSTRACT

A method and device for image generation are provided. The method includes: obtaining a text describing a content of an image to be generated; extracting, using a text encoder, a text feature vector from the text; determining a semantic mask as spatial constraints of the image to be generated; and automatically generating the image using a generative adversarial network (GAN) model according to the semantic mask and the text feature vector.

17 Claims, 5 Drawing Sheets
(4 of 5 Drawing Sheet(s) Filed in Color)

(51) Int. Cl.
*G06F 40/126* (2020.01)
*G06F 40/20* (2020.01)
*G06F 40/279* (2020.01)
*G06F 40/289* (2020.01)
*G06F 40/30* (2020.01)
*G06N 3/02* (2006.01)
*G06N 3/045* (2023.01)
*G06N 3/0475* (2023.01)
*G06T 11/00* (2006.01)
*G06V 10/70* (2022.01)
*G06V 10/82* (2022.01)
*H04N 21/81* (2011.01)

(52) U.S. Cl.
CPC ......... *G06F 40/279* (2020.01); *G06F 40/289* (2020.01); *G06F 40/30* (2020.01); *G06N 3/02* (2013.01); *G06N 3/045* (2023.01); *G06N 3/0475* (2023.01); *G06V 10/70* (2022.01); *G06V 10/768* (2022.01); *G06V 10/82* (2022.01); *H04N 21/8153* (2013.01); *G06T 2207/20084* (2013.01)

(58) Field of Classification Search
CPC .......... G06T 9/00; G06T 9/002; G06T 9/004; G06T 11/00; G06T 11/20; G06T 11/203; G06T 11/40; G06T 11/60; G06T 11/80; G06T 2207/20016; G06T 2207/20021; G06T 2207/20084; G06N 3/02; G06N 3/04; G06N 3/044; G06N 3/0442; G06N 3/045; G06N 3/0455; G06N 3/047; G06N 3/0475; G06N 3/088; G06N 3/094; G06V 10/70; G06V 10/768; G06V 10/82; G06V 20/70; H04N 19/20; H04N 19/21; H04N 19/23; H04N 19/25; H04N 19/30; H04N 21/80; H04N 21/81; H04N 21/8146; H04N 21/8153

USPC ....... 382/100, 155–161, 173, 176, 180, 190, 382/195, 198, 203, 205, 206, 229, 276, 382/282, 283, 298–300, 302, 303; 345/441, 467, 471, 619, 625–630, 345/632–641, 645, 648, 660, 667; 706/12, 15–17, 20–22, 25, 28, 31; 715/243, 246, 254
See application file for complete search history.

(56) References Cited

U.S. PATENT DOCUMENTS

| | | | |
|---|---|---|---|
| 10,891,969 B2* | 1/2021 | Huang | G06F 40/30 |
| 10,971,121 B2* | 4/2021 | Kakoyiannis | G06F 16/61 |
| 2021/0142539 A1* | 5/2021 | Ayush | G06N 3/045 |
| 2021/0158503 A1* | 5/2021 | Li | G06F 18/214 |
| 2021/0272341 A1* | 9/2021 | Swaminathan | G06V 10/82 |

OTHER PUBLICATIONS

Wenbo Li, Pengchuan Zhang, Lei Zhang, Qiuyuan Huang, Xiaodong He, Siwei Lyu, Jianfeng Gao, "Object-driven Text-to-Image Synthesis via Adversarial Training", arXiv, arXiv:1902.10740v1, Feb. 2019, pp. 1-23 (Year: 2019).*

Seunghoon Hong, Dingdong Yang, Jongwook Choi, Honglak Lee, "Inferring Semantic Layout for Hierarchical Text-to-Image Synthesis" arXiv, arXiv:1801.05091v2, Jul. 2018, pp. 1-15 (Year: 2018).*

Bowen Li, Xiaojuan Qi, Thomas Lukasiewicz, Philip H. S. Torr, "Controllable Text-to-Image Generation", arXiv, arXiv:1909.07083v2, Dec. 2019, pp. 1-11 (Year: 2019).*

Tao Xu, Pengchuan Zhang, Qiuyuan Huang, Han Zhang, Zhe Gan, Xiaolei Huang, Xiaodong He, "AttnGAN: Fine-Grained Text to Image Generation with Attentional Generative Adversarial Networks", IEEE, 2018 IEEE/CVF Conference on Computer Vision and Pattern Recognition, 2018, pp. 1316-1324 (Year: 2018).*

* cited by examiner

"the bird has a red crown that is striped and a red breast."

Text — AttnGAN (Prior Art) — SegAttnGAN — SegAttnGAN (self-attention)

METHOD AND DEVICE FOR TEXT-BASED IMAGE GENERATION

CROSS-REFERENCE TO RELATED APPLICATION

This application claims the priority of U.S. Provisional Patent Application No. 63/048,505, filed on Jul. 6, 2020, the entire contents of which are incorporated herein by reference.

FIELD OF THE DISCLOSURE

The present disclosure relates to the field of image processing technologies and, more particularly, relates to method and device for text-based image generation.

BACKGROUND

The task of generating high fidelity, realistic-looking images based on semantic description is useful to many applications. A lot of research has been focused on the text-to-image synthesis task, which takes in natural language descriptions to generate images matching the text. In existing technology, a generative adversarial network (GAN) model, conditioned on the text input, is used for image generation. However, existing GAN models have little control over the layout of the generated images. Frequently, these models would generate objects with deformed shapes or images with unrealistic layouts. FIG. 4 illustrate a sample result image generated by AttnGAN model proposed by Xu et al. in "AttnGAN: Fine-grained text to image generation with attentional generative adversarial networks," Proceedings of the IEEE conference on computer vision and pattern recognition, 2018.

The disclosed method and system are directed to solve one or more problems set forth above and other problems.

BRIEF SUMMARY OF THE DISCLOSURE

One aspect of the present disclosure provides a method for image generation applied to a computing device. The method includes: obtaining a text describing a content of an image to be generated; extracting, using a text encoder, a text feature vector from the text; determining a semantic mask as spatial constraints of the image to be generated; and automatically generating the image using a generative adversarial network (GAN) model according to the semantic mask and the text feature vector.

Another aspect of the present disclosure provides a device for image generation. The device includes a memory and a processor coupled to the memory. The processor is configured to perform a plurality of operations including: obtaining a text describing a content of an image to be generated; extracting, using a text encoder, a text feature vector from the text; determining a semantic mask as spatial constraints of the image to be generated; and automatically generating the image using a generative adversarial network (GAN) model according to the semantic mask and the text feature vector.

Another aspect of the present disclosure provides a non-transitory computer readable storage medium that has computer instructions stored thereon. The computer instructions can, when being executed by a processor, cause the processor to perform: obtaining a text describing a content of an image to be generated; extracting, using a text encoder, a text feature vector from the text; determining a semantic mask as spatial constraints of the image to be generated; and automatically generating the image using a generative adversarial network (GAN) model according to the semantic mask and the text feature vector.

Other aspects of the present disclosure can be understood by those skilled in the art in light of the description, the claims, and the drawings of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a method and device for text-based image generation, i.e., text-to-image generation. The disclosed method and/or device can be applied in any proper occasions where an image is desired to be generated based on a text description. The disclosed image generation/synthesis process is implemented based on a generative adversarial network (GAN) model with segmentation attention, i.e., SegAttnGAN model, which utilizes global spatial attention from segmentation data as an additional input besides the text description to guide the image generation. The addition of spatial attention mechanism in the disclosed SegAttnGAN model is verified to have substantially increased visual realism by regulating object shapes and image layouts.

Figure 4:
FIG. 4 illustrates a sample result generated by AttnGAN model in prior art and sample results generated by SegAttnGAN model, and self-attention SegAttnGAN model according to the same text description according to some embodiments of the present disclosure.
Figure 4:
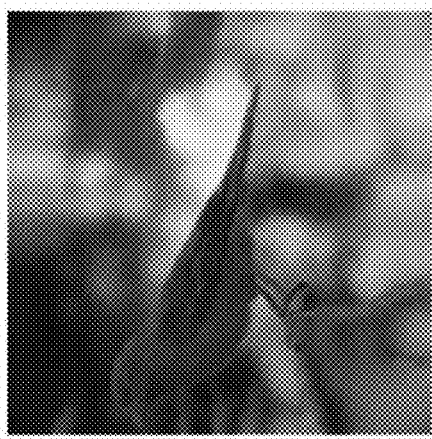
Figure 4:
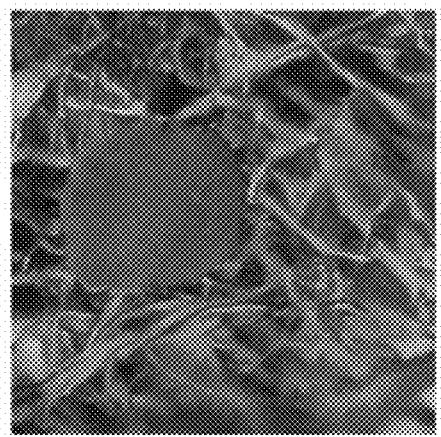

In some embodiments, the disclosed process further includes building a self-attention network to generate segmentation masks, and then use the generated segmentation masks for image generation. This is referred as self-attention SegAttnGAN model, which has also demonstrated desired capability of constraining the shapes of target objects in result images. FIG. 4 illustrates a sample result generated by AttnGAN model in prior art and sample results generated by SegAttnGAN model, and self-attention SegAttnGAN model according to the same text description according to some embodiments of the present disclosure. As shown in FIG. 4, when the AttnGAN model in prior art generates an image with deformed shape based on the input text description, both the disclosed SegAttnGAN model and self-attention SegAttnGAN model can output realistic images. The AttnGAN model proposed by Xu et al. is used as a baseline model throughout the present disclosure for comparison and for demonstrating the performance provided by the disclosed method/device.

Semantic information (e.g., segmentation mask) can provide guidance in image generation. It should be noted that different from other image generation techniques where semantic maps or masks are used as guidance for image-to-image translation or image-to-image generation, the disclosed method and device uses semantic masks for text-to-image generation. In addition, semantic information is not considered or used by the AttnGAN model in the prior art.

Figure 1:
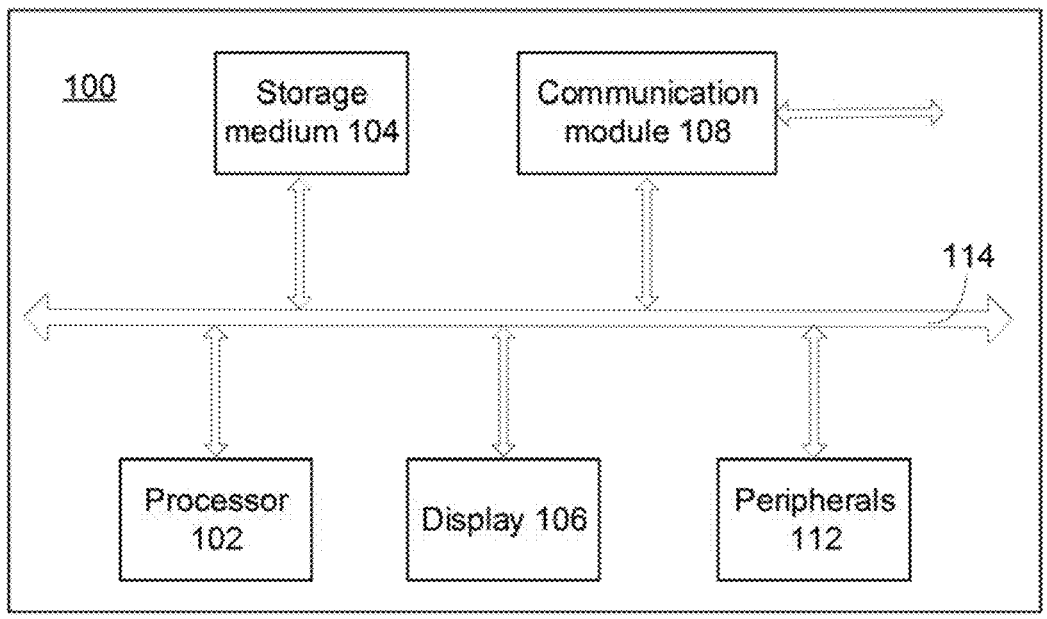
FIG. 1 is a block diagram of an exemplary computing system according to some embodiments of the present disclosure.

FIG. 1 is a block diagram of an exemplary computing system/device capable of implementing the disclosed image generation method according to some embodiments of the present disclosure. As shown in FIG. 1, computing system 100 may include a processor 102 and a storage medium 104. According to certain embodiments, the computing system 100 may further include a display 106, a communication module 108, additional peripheral devices 112, and one or more bus 114 to couple the devices together. Certain devices may be omitted and other devices may be included.

Processor 102 may include any appropriate processor(s). In certain embodiments, processor 102 may include multiple cores for multi-thread or parallel processing, and/or graphics processing unit (GPU). Processor 102 may execute sequences of computer program instructions to perform various processes, such as an image generation and colorization program, a GAN model training program, etc. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs for implementing various processes, when executed by processor 102. Storage medium 104 may also include one or more databases for storing certain data such as image data, training data set, testing image data set, data of trained GAN model, and certain operations can be performed on the stored data, such as database searching and data retrieving.

The communication module 108 may include network devices for establishing connections through a network. Display 106 may include any appropriate type of computer display device or electronic device display (e.g., CRT or LCD based devices, touch screens). Peripherals 112 may include additional I/O devices, such as a keyboard, a mouse, and so on.

In operation, the processor 102 may be configured to execute instructions stored on the storage medium 104 and perform various operations related to an image generation method as detailed in the following descriptions.

Figure 2:
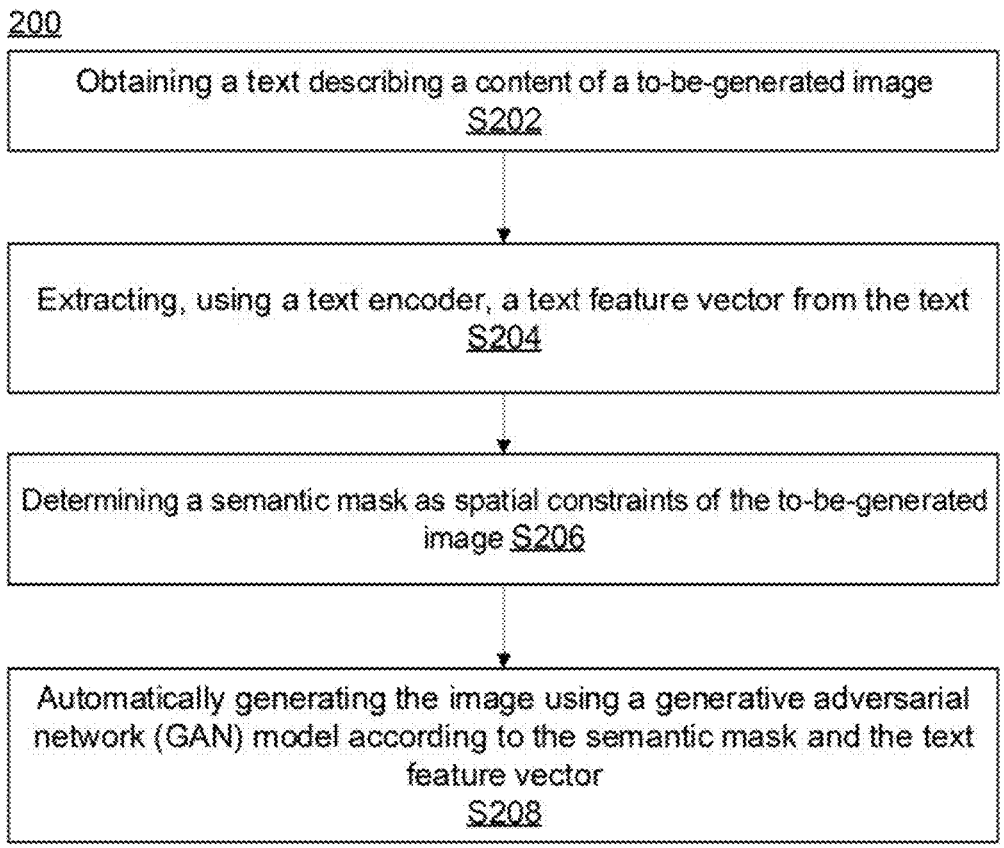
FIG. 2 illustrates an exemplary image generation process according to some embodiments of the present disclosure.
Figure 3:
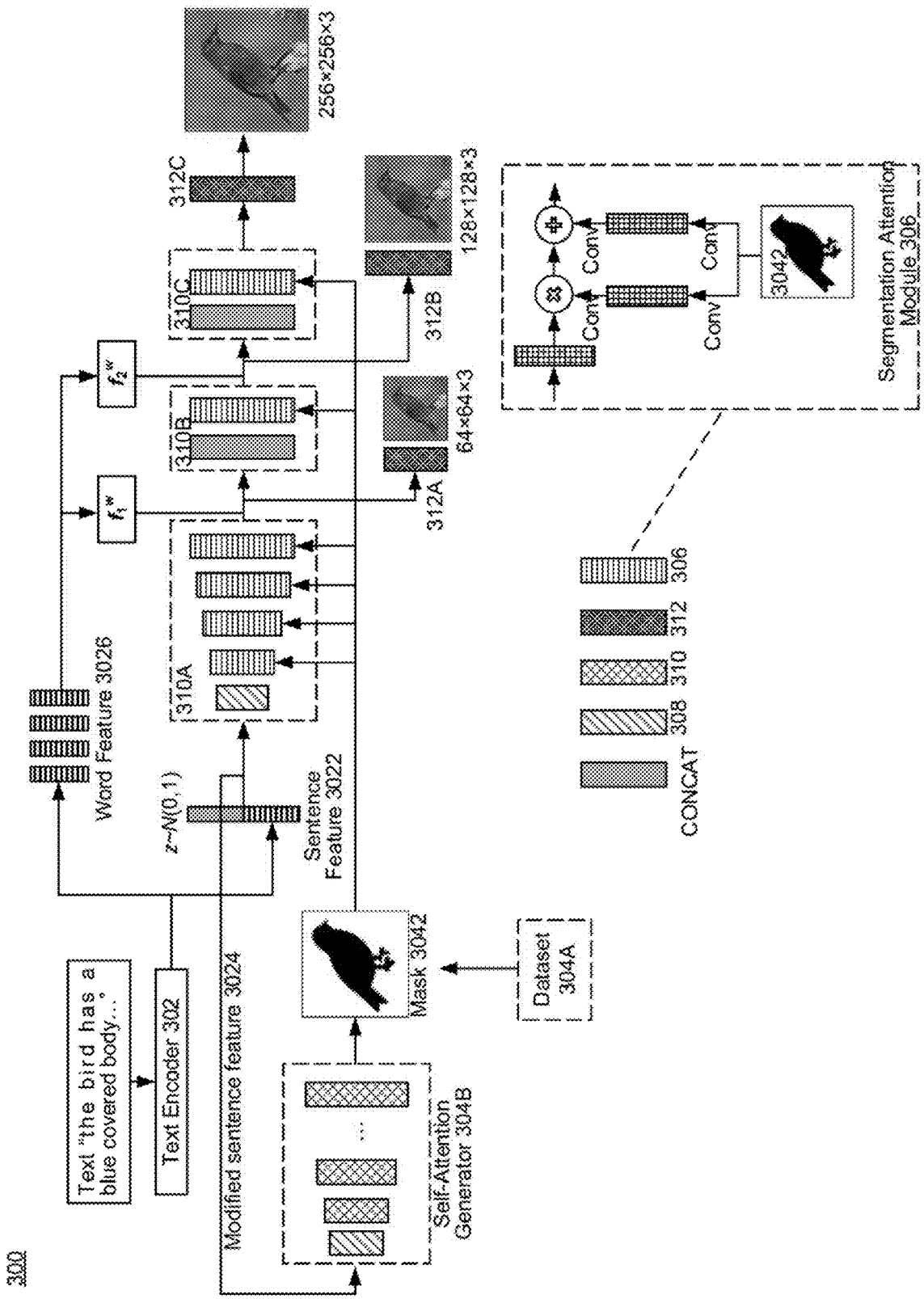
FIG. 3 is a block diagram illustrating an exemplary framework of image generation according to some embodiments of the present disclosure.

FIG. 2 illustrates an exemplary image generation process 200 according to some embodiments of the present disclosure. FIG. 3 is a block diagram illustrating an exemplary framework 300 of image generation according to some embodiments of the present disclosure. The process 200 may be implemented by an image generation device which can be any suitable computing device/server having one or more processors and one or more memories, such as computing system 100 (e.g., processor 102). The framework 300 may be implemented by any suitable computing device/server having one or more processors and one or more memories, such as computing system 100 (e.g., processor 102).

As shown in FIG. 2 and FIG. 3, a text describing a content of a to-be-generated image is obtained (S202). The text may be a sentence such as "the bird has a red crown that is striped and a red breast," or "this flower is blue and white in color, with petals that are oval shaped." In some embodiments, the text may be entered to a graphical user interface of the disclosed image generation device, or may be recognized and converted from a voice command inputted to the disclosed device through speech recognition. In some embodiments, the text is a whole sentence.

Further, a text encoder is used to extract a text feature vector from the text (S204). For example, word features and sentence features are extracted from the text and encoded to a text feature vector. The text feature vector may refer to one or more conditional vectors used by a word attention model (e.g., a GAN model) to generate an image conditioned on description from the text. The text feature vector may include a sentence feature vector 3022 and a word feature vector 3026. The sentence feature vector 3022 may focus on describing global feature of a whole sentence of the text. The word feature vector 3026 may include each word as an element and may provide detailed guidance to sub-regions of the image. In some embodiments, the text can be input into a text encoder 302, and the text encoder 302 is configured to generate the text feature vector (e.g., a sentence feature vector and a word feature vector) based on the input text. In some embodiments, the text encoder may be a Long short-term memory (LSTM) encoder. In some embodiments, in the word attention model, the word feature vector is used directly as word-level attention, and the sentence feature vector is concatenated with a random latent vector (also referred as z vector). The vector obtained from concatenating the sentence feature vector and the latent vector may be referred as modified sentence feature vector 3024. The modified sentence feature vector 3024 is considered as one of the text feature vector. In some embodiments, the random latent vector may include multiple elements, each element being a random number ranging from 0 to 1.

Further, a semantic mask is determined as spatial constraints of the to-be-generated image (S206). The semantic mask may also be referred as a segmentation mask, a segmentation map, or a semantic map. The semantic map (or simply called mask) 3042 may be an image having a same size as a target image (e.g., the to-be-generated image or resized to have the same resolution as an intermediate image in the generation process) and describing contours of content (s) of the target image. That is, a semantic map is associated with one or more semantic labels, each pixel of the semantic map having a corresponding semantic label. Pixels with the same semantic label depict a same topic/content. In other words, the semantic map includes a plurality of regions, and pixels of a same region of the semantic map has a same semantic label indicating the content of the region. For example, a semantic map may include regions labeled as bird, background, sky, mountain, etc. In some embodiments, the mask 3042 may be a binary image containing a single content/subject that describes the contour/shape of the content, and each pixel of the binary image is labeled as either the target subject or background.

The semantic map is, together with the text feature vector, used as attention input for the disclosed GAN model. In one embodiment, the semantic map 3042 may be a pre-existing mask selected from a dataset 304A. The selection may be a manual interference that chooses a desired shape/contour of the image to be generated. The disclosed GAN model using a pre-existing mask as spatial constraints may be referred as SegAttnGAN model. In another embodiment, the semantic map 3042 may be automatically generated by a trained self-attention generator 304B according to the modified sentence feature vector 3024. The disclosed GAN model using the automatically generated mask as spatial constraints may be referred as self-attention SegAttnGAN model.

In the self-attention SegAttnGAN model, a self-attention generator generates the segmentation mask and is trained with a corresponding discriminator. The training of the self-attention generator utilizes coarse-to-fine training strategy, with multiple resolutions from low to high (e.g., from 64*64, 128*128 to 256*256). At each resolution level, there is a discriminator for training. The training dataset may include texts and target semantic maps obtained from original images corresponding to the texts. The training aims to find a generator that generates, using the modified sentence feature vector extracted from a text as input, a semantic map closest to the target semantic map corresponding to the text. In operation, the trained self-attention generator takes the same modified sentence feature vector 3024 from SegAttnGAN as input, which is a concatenated vector of z vector (i.e., random latent vector) and text embedding vector (i.e., sentence feature vector 3022). In some embodiments, the sentence feature vector 3022 is used by the self-attention generator and the word feature vector 3026 is not used. Further details of a discriminator and a generator used in the disclosed GAN model will be described below.

An image is automatically generated using a generative adversarial network (GAN) model according to the semantic mask and the text feature vector (S208). That is, the text feature vector and the spatial constraints (i.e., semantic map) are conditions fed into the disclosed GAN model to generate a desired image.

In some embodiments, the disclosed GAN model contains a generator and a multi-scale discriminator. The generator is trained using the multi-scale discriminator and is configured to generate an image according to text feature and spatial constraints. The framework includes multiple generators 312 and multiple upsampling blocks 310 arranged in series, to achieve coarse-to-fine strategy. One generator may have a corresponding upsampling block. Each upsampling block 310 may include one or more convolutional layers and attention layers that accept semantic map as shape constraints. The input for an upsampling block may also include text feature so that the image is conditioned on the text description. The input for an upsampling block other than the first one further includes the outcome of its previous upsampling block. The outcome of an upsampling block is also referred as hidden features for its next upsampling block. That is, in operation, both the training process and the image generation process go through the multiple upsampling blocks sequentially, with corresponding resolutions from low to high (i.e., an upsampling block corresponding to a coarse resolution is processed before an upsampling block corresponding to a higher resolution). In the training process, at each resolution level, after going through the corresponding upsampling block, the generator generates an image to be evaluated by a discriminator of the corresponding resolution, so as to train an optimal generator. In the image generation process, the trained generator at each resolution level generates an image having the corresponding resolution.

In some embodiments, the image generation process may start with inputting the modified sentence feature vector 3024 (i.e., a vector obtaining by concatenating the sentence feature vector 3022 with a random latent vector) to a fully connected neural network 308, and adding the spatial constraints (i.e., semantic map 3042) to initiate the process in the upsampling blocks 310. The exemplary first generator 312A, as shown in FIG. 3, may be configured to generate an image at resolution 64*64 according to the sentence feature vector 3022, the random latent vector z, and the semantic map 3042 resized at 64*64 through several layers of upsampling and convolution operations (e.g., performed by the segmentation attention module 306). In some embodiments, the word feature vector 3026, denoted as $f_1^w$ may be used as a word-level attention and be combined/concatenated with the outcome of an upsampling block 310A to be used in the upsampling block 310B. The second generator 312B is configured to generate an image at resolution 128*128 according to the word feature vector 3026, the hidden features from the previous upsampling block 310A, and the semantic map resized at 128*128. Similarly, the word feature vector 3026, denoted as $f_2^w$ may be combined with the outcome of an upsampling block 310B to be used in the upsampling block 310C. The third generator 312C is configured to generate an image at resolution 256*256 according to the word feature vector 3026, the hidden features from the previous upsampling block 310B, and the semantic map resized at 256*256 through one set/layer of upsampling and convolution operations. It can be understood that the number of generators and the number of resolution levels are listed as exemplary purposes, which are not limited in the present disclosure.

Specifically, the spatial constraint of an input semantic map may be preserved (i.e., added to the GAN model) by a segmentation attention module 306. Mathematically, F denotes features from a previous layer (e.g., upsampling and convolution layer) in the disclosed model (e.g., in framework 300) and S denotes a semantic map. In a first layer, F denotes a matrix converted according to the modified sentence feature vector. The output of the segmentation attention module, which preserves spatial constraints, is expressed as in Equation (1):

$$F'=BN(F)*\text{Conv}(S)+\text{Conv}(S) \qquad (1)$$

In Equation (1), BN( ) denotes batch normalization function and Conv( ) denotes convolution function. One property of this function is to preserve spatial information of the segmentation mask. By introducing the semantic map attention into each upsampling layer in a coarse-to-fine strategy, this model can avoid the semantics being eliminated by pure upsampling layers.

In some embodiments, each time the segmentation attention module 306 is used, the semantic map 3042 functioning as a shape constraint may be resized to have the same resolution as the current layer (e.g., corresponding to the hidden features). The generator may apply a spatially-adaptive method and use resized semantic map as attention input for the corresponding upsampling block. For example, the input of a current upsampling block 310B corresponding to resolution 128*128 may be the outcome of the previous upsampling block 310A corresponding to resolution 64*64; and the semantic map 3042 used for the attention layers in the current upsampling block 310B may be resized to 128*128. In some embodiments, the resolution corresponds to each upsampling layer may be increased (e.g., doubled) from that corresponding to the previous upsampling layer. For example, the resolutions may include 4*4, 8*8, 16*16, . . . , until 1024*1024.

The generator 312 may output an intermediate image at an intermediate upsampling block (e.g., block 310B), or the final image at the last upsampling block (e.g., block 310C). The generator may output an image having a resolution same as the resolution corresponding to the upsampling block. In some embodiments, the image from the outcome of an upsampling block may be enlarged (e.g., such as enlarging a 64*64 image to 128*128 image) before being inputted to the next upsampling block with similar configurations. Each generated image may include n color channels (e.g., n=3), making data size of the image to be height*width*n.

In some embodiments, in the disclosed GAN model, a first generator determines a first image and first hidden features according to the modified sentence feature vector and the semantic mask down-sampled to a first resolution; and an i-th generator determines, according to (i−1)th hidden features determined by an (i−1)th generator and the semantic mask having an i-th resolution, an i-th image having the i-th resolution and i-th hidden features. Here, i is an integer greater than 1. In addition, the i-th image determined by the i-th generator is further according to the word feature vector. In other words, the word feature vector also affects the i-th generator when determining the i-th image.

Accordingly, the output of the framework 300 and the process 200 is an image generated from the disclosed GAN model. The image may be displayed on a graphical user interface on the computing device.

As previously mentioned, the training of the generator aims to learn how to output target images according to text features and semantic maps. The multi-scale discriminator, on the other hand, with the generated images as inputs, aims to make sure the image generated by the generator is as similar to the target one. The multi-scale discriminator is only used at the training stage.

For training the disclosed generative adversarial network, the objective function with conditional inputs is a min-max game between the generator G and the multi-scale discriminator D defined in Equation 2.

$$\min_G \max_D V(G, D) = \qquad (2)$$
$$E_{x \sim P_{data}(x)}[\log D(x, t)] + E_{z \sim P_z(z)}[\log (1 - D(G(z, t, s), t))]$$

In Equation (2), x refers to images from real data distribution and z represents the random latent vector which drives fake data generation. t refers to text feature vector and s refers to the semantic map. V( ) denotes quantity function, P( ) denotes probability distribution function and E( ) denotes expected value function. G(z,t,s) represents an image generated by the generator G according to the random latent vector z, the text feature vector t, and the semantic map s. D(G(z,t,s),t) represents an evaluation performed by the discriminator about how the generated image fit the text description. D(x,t) represents an evaluation on the real image and the text description. Equation (2) aims to maximize V(G,D) while minimize loss value of the generator and the discriminator.

In the disclosed SegAttnGAN model where the semantic mask is obtained from a dataset, the loss function LO for a generator Gi is defined in Equation (3-1):

$$L_{G_i} = -E_{z \sim P_z(z)}[\log(D_i(G_i(z,t,s)))]/2 - E_{z \sim P_z(z)}[\log(D_i(G_i(z,t,s),t))]/2 \qquad (3)$$

In equation (3), the first term is an unconditional loss determining whether the image is real or fake, and the second term, the conditional loss, determines whether the generated image matches the text description. In addition, i denotes a resolution scale serial number. For example, when there are m resolution scales (e.g., m=3, resolutions 64*64, 128*128, and 256*256 as shown in FIG. 3), i equal to 0, 1, . . . and m−1.

In the disclosed in the SegAttnGAN model, the loss function for discriminator Di is defined as in Equation (4):

$$L_{D_i} = -E_{x \sim P_{data}(x)}[\log(D_i(x))]/2 - E_{z \sim P_z(z)}[\log(1-D_i(G_i(z,t,s)))]/2 - E_{x \sim P_{data}(x)}[\log(D_i(x,t))]/2 - E_{z \sim P_z(z)}[\log(1-D_i(G_i(z,t,s),t))]/2 \qquad (4)$$

In Equation (4), the first two terms are corresponding to the unconditional loss for optimizing the discriminator, and the last two terms are conditional losses according to the text feature.

The overall Loss function for the generator the SegAttnGAN model is defined in Equation (5-1):

$$L = L_G + \lambda L_{DAMSM} \text{ where } L_G = \Sigma_{i=0}^{m-1} L_{G_i} \qquad (5\text{-}1)$$

In Equations (5-1), $L_{DAMSM}$ can be obtained according to a Deep Attentional Multimodal Similarity Model (DAMSM) loss defined in the AttnGAN model by Xu et al.

In the self-attention SegAttnGAN model where the sematic map is automatically generated. $G_s$ denotes the self-attention generator 304B. $G_s(z,t)$ is used instead of s in Equations (3) and (4) to define generator loss and discriminator loss. The overall loss of the self-attention SegAttnGAN model is defined in Equation (5-2):

$$L = L_G + L_{G_s} + \lambda L_{DAMSM} \text{ where} \qquad (5\text{-}2)$$
$$L_G = \sum_{k=0}^{m-1} L_{G_i}, L_{G_s} = \sum_{k=0}^{m-1} L_{G_{s_i}}$$

In some embodiments, in an implementation example, CUB (Caltech-UCSD Birds) and Oxford-102 datasets were used to evaluate the disclosed GAN models. The CUB dataset contains images of different birds in 200 categories. 8841 images from this dataset were used for training and 2947 images were used for testing. Oxford-102 is a dataset consists of flower images. From this dataset, 6141 images were used for training and 2047 images were used for testing.

In the implementation example, the trained generators in the disclosed SegAttnGAN model and the disclosed self-attention SegAttnGAN model outputted 64*64, 128*128, and 256*256 images. The semantic mask is processed into label maps (each channel contains different objects). At each upsampling layer of the generator, the segmentation label maps are down-sampled into the same resolution tensors as the current hidden features in the generator. The attention module is applied after the previous upsampling operations. The text and image encoders followed the same implementation from the AttnGAN model. For self-attention SegAttnGAN, there is no word features for the self-attention generator. The text embedding dimension was set to 256 (i.e., the dimension of the modified sentence feature vector that combines the sentence feature and the latent vector was set to 256), and loss weight λ was set to 5.0. ADAM solver with $beta_1$=0.5 and a learning rate of 0.0002 are used for generator and discriminators.

Two quantitative measurements were used to evaluate generated images. The first metric is Inception Score proposed by Tim et al. in "Improved techniques for training GANs," arXiv preprint arXiv:1606.03498 (2016), which has been widely used to evaluate the quality of generated images. Another metric is R-precision, which has been proposed by Xu et al. in "AttnGAN: Fine-grained text to image generation with attentional generative adversarial networks," proceedings of the IEEE conference on computer vision and pattern recognition, 2018, as a complimentary evaluation metric for the text-to-image synthesis task to determine whether the generated image is well conditioned on the given text description.

Specifically, Inception Score of the generated images using the disclosed SegAttnGAN model and self-attention SegAttnGAN model were recorded and compared with those from other state-of-art methods including GAN-INT-CLS model proposed by Reed et al. in "Generative adversarial text-to-image synthesis" in Proceedings of The $33^{rd}$ International Conference on Machine Learning, 2016, GAWWN model proposed by Reed et al. in "Learning what and where to draw," in arXiv preprint arXiv:1610.02454 (2016), StackGAN model proposed by Zhang et al. in "Stackgan: Text to photo-realistic image synthesis with stacked generative adversarial networks," In Proceedings of the IEEE international conference on computer vision 2017, StackGAN++ model proposed by Zhang et al. in "StackGAN++: Realistic Image Synthesis with Stacked Generative Adversarial Networks," in IEEE transactions on pattern analysis and machine intelligence 41.8 (2018): 1947-1962, the AttnGAN model proposed by Xu et al. as previously mentioned, and MirrorGAN model proposed by Qiao et al. in "Mirrorgan: Learning text-to-image generation by redescription," in Proceedings of the IEEE/CVF Conference on Computer Vision and Pattern Recognition, 2019. The comparisons on both CUB and Oxford-102 datasets are shown in Table 1. The disclosed SegAttnGAN model achieved the highest Inception Score on both CUB and Oxford-102 datasets. Compared with the baseline model AttnGAN, the disclosed SegAttnGAN model boosts Inception Score from 4.36 to 4.82 on CUB dataset. The self-attention SegAttnGAN model also had a good Inception Score of 4.44 on CUB and 3.36 on Oxford-102 dataset.

TABLE 1

Inception score of start-of-art models and the disclosed models on CUB and Oxford-102 datasets

| Model | CUB | Oxford-102 |
|---|---|---|
| GAN-INT-CLS | 2.88 ± 0.04 | 2.66 ± 0.03 |
| GAWWN | 3.62 ± 0.07 | — |
| StackGAN | 3.70 ± 0.04 | 3.20 ± 0.01 |
| StackGAN++ | 3.82 ± 0.06 | 3.26 ± 0.01 |
| AttnGAN (baseline) | 4.36 ± 0.03 | — |
| MirrorGAN | 4.56 ± 0.05 | — |
| SegAttnGAN (self-attention) | 4.44 ± 0.06 | 3.36 ± 0.08 |
| SegAttnGAN | 4.82 ± 0.05 | 3.52 ± 0.09 |

The comparison result of the R-precision scores are shown in Table 2. Both the disclosed SegAttnGAN model and self-attention SegAttnGAN model had almost the same score as the baseline model AttnGAN, indicating that these models can generate images consistent with input text descriptions. MirrorGAN got the highest R-precision score as it contains a module especially for improving semantics consistency.

TABLE 2

R-precision score (%) of start-of-art models and the disclosed models on CUB dataset

| Model | CUB |
|---|---|
| AttnGAN (baseline) | 53.31 |
| MirrorGAN | 57.67 |
| SegAttnGAN (self-attention) | 52.29 |
| SegAttnGAN | 52.71 |

The disclosed segmentation attention module 306 were applied to StackGAN++ for comparison. The Inception scores are shown in Table 3. These results indicate that the disclosed segmentation attention module can help constrain the training of different GAN models by extra semantics information and get better image generation quality.

TABLE 3

Inception score (%) of comparisons of the models with and without the disclosed segmentation attention module

| Model | CUB |
|---|---|
| AttnGAN | 4.36 ± 0.03 |
| AttnGAN + segmentation attention | 4.82 ± 0.05 |
| StackGAN++ | 3.82 ± 0.06 |
| StackGAN++ + segmentation attention | 4.31 ± 0.04 |

Figure 5:
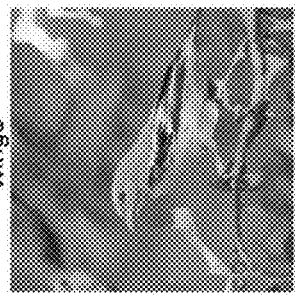
FIG. 5 illustrates additional sample results generated by AttnGAN model in prior art, and sample results generated by the SegAttnGAN model and the self-attention SegAttnGAN model according to the same text descriptions according to some embodiments of the present disclosure.
Figure 6:
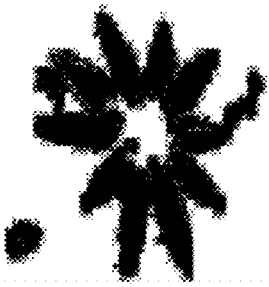
FIG. 6 illustrates sample results generated from the self-attention SegAttnGAN model, corresponding text descriptions, and corresponding segmentation mask according to some embodiments of the present disclosure.
Figure 6:
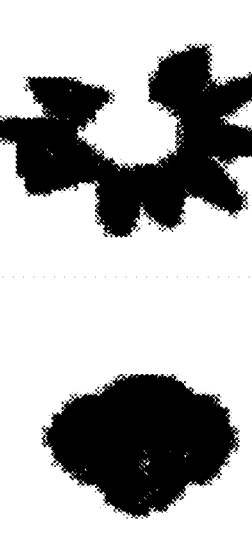
Figure 6:
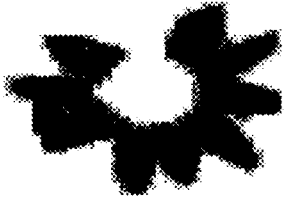
Figure 6:
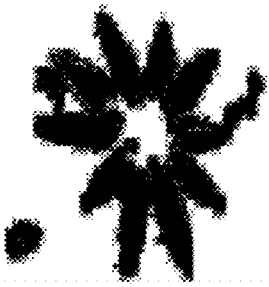
Figure 6:
Figure 6:
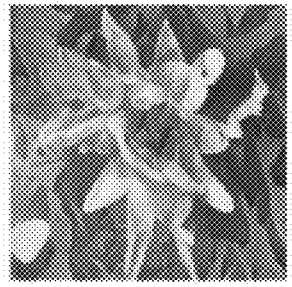
Figure 6:
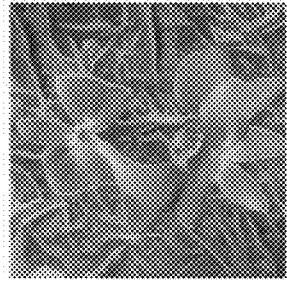
Figure 6:
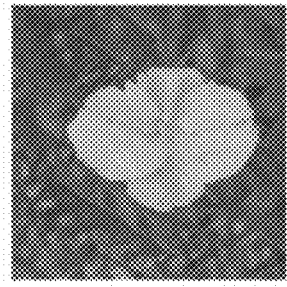
Figure 6:
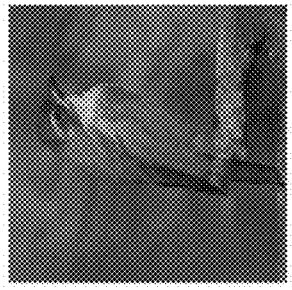
Figure 6:
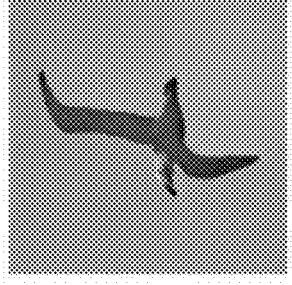

FIG. 5 illustrate some samples generated by AttnGAN model and the two disclosed models based on the same text descriptions. Compared to the baseline model AttnGAN, the disclosed SegAttnGAN generates results with better object shape. The self-attention SegAttnGAN uses automatically generated segmentation masks and can constrain the object shapes and generate better images than AttnGAN. FIG. 6 illustrate some samples of the shape and text constrain output images of self-attention SegAttnGAN on CUB and Oxford-102 datasets. As shown in the figure, words related to color such as yellow and blue lead to results with different colors. The object shapes in generated images matching the input masks demonstrates that the segmentation map provides very good control over object shapes.

To sum up, the present disclosure provides a method and device that utilizes a GAN model for text-to-image synthesis tasks, which uses segmentation attention to constrain the GAN training. The results provided in the implementation example demonstrates that the disclosed GAN model successfully generates better quality images compared to other state-of-art methods. With the segmentation masks from datasets as input, the disclosed SegAttnGAN model achieves the highest Inception Scores on both CUB and Oxford-102 datasets. When the masks are generated via the self-attention generator, the self-attention SegAttnGAN model also generates results with better visual realism compared to other state-of-art methods.

Those skilled in the art should know that: all or part of the steps of the method embodiment may be implemented by related hardware instructed through a program, the program may be stored in a computer-readable storage medium, and the program is executed to execute the steps of the method embodiment; and the storage medium includes: various media capable of storing program codes, such as mobile storage equipment, a Read-Only Memory (ROM), a magnetic disk or a compact disc.

Alternatively, when the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for image generation, applied to a computing device, comprising:
    obtaining a text describing a content of an image to be generated;
    extracting, using a text encoder, a text feature vector from the text, the text feature vector including a sentence feature vector describing a global feature of a whole sentence of the text;
    obtaining a modified sentence feature vector of the text by concatenating the sentence feature vector and a random latent vector;
    determining a semantic mask as spatial constraints of the image to be generated; and
    automatically generating the image using a generative adversarial network (GAN) model according to the semantic mask and the text feature vector,
    wherein determining the semantic mask comprises:
        before using the GAN model, automatically determining, by a trained self-attention generator according to the modified sentence feature vector, the semantic mask as the spatial constraints of the image to be generated, wherein the self-attention generator is include training texts and target semantic" to—trained based on a first training data set that includes training texts and target semantic, maps obtained from original images corresponding to the training texts, and the trained self-attention generator is configured to generate, using a modified sentence feature vector extracted from a training text of the training texts as input, a candidate semantic mask closest to the target semantic map corresponding to the training text.

2. The method according to claim 1, wherein the semantic mask is a binary image describing a shape of the content.

3. The method according to claim 1, wherein determining the semantic mask comprises:
    determining, from a dataset, a pre-existing mask as the semantic mask.

4. The method according to claim 1, wherein:
    the GAN model includes multiple generators corresponding to multiple resolutions arranged in series from a lower resolution to a higher resolution; and
    generating the image using the GAN model comprises:
        determining, using a first generator, a first image and first hidden features according to the modified sentence feature vector of the text and the semantic mask down-sampled to a first resolution; and
        determining, using an i-th generator according to (i−1) th hidden features determined by an (i−1) th generator and the semantic mask having an i-th resolution, an i-th image having the i-th resolution and i-th hidden features, wherein i is an integer greater than 1.

5. The method according to claim 4, wherein:
    the text feature vector further includes a word feature vector obtained according to each word in the text; and
    the i-th image is determined by the i-th generator according to the word feature vector.

6. The method according to claim 1, wherein generating the image using the GAN model comprises:
    using the semantic mask as the spatial constraints by performing a convolution operation based on the semantic mask and a matrix converted from the modified sentence feature vector of the text.

7. The method according to claim 6, wherein in a first layer of the GAN model, F denotes a matrix converted according to the modified sentence feature vector of the text, and an output of the self-attention generator, which preserves the spatial constraints, is expressed as in the following equation:

$$F'=BN(F)*\text{Conv}(S)+\text{Conv}(S)$$

wherein BN ( ) denotes a batch normalization function, Conv ( ) denotes a convolution function and S denotes a semantic mask.

8. The method according to claim 1, wherein:
    the text feature vector further includes a word feature vector used by the GAN model to generate the image, and
    the word feature vector is not used by the trained self-attention generator to generate the semantic mask.

9. A device for image generation, comprising:
    a memory; and
    a processor coupled to the memory and configured to perform a plurality of operations comprising:
    obtaining a text describing a content of an image to be generated;
    extracting, using a text encoder, a text feature vector from the text, the text feature vector including a sentence feature vector describing a global feature of a whole sentence of the text;
    obtaining a modified sentence feature vector of the text by concatenating the sentence feature vector and a random latent vector;
    determining a semantic mask as spatial constraints of the image to be generated; and
    automatically generating the image using a generative adversarial network (GAN) model according to the semantic mask and the text feature vector,
    wherein determining the semantic mask as the spatial constraints comprises:
        before using the GAN model, automatically determining, by a trained self-attention generator according to the modified sentence feature vector, the semantic mask as the spatial constraints of the image to be generated, wherein the self-attention generator is trained based on a first training data set that includes training texts and target semantic maps obtained from original images corresponding to the training texts, and the trained self-attention generator is configured to generate, using a modified sentence feature vector extracted from a training text of the training texts as input, a candidate semantic mask closest to the target semantic map corresponding to the training text.

10. The device according to claim 9, wherein the semantic mask is a binary image describing a shape of the content.

11. The device according to claim 9, wherein determining the semantic mask comprises:
determining, from a dataset, a pre-existing mask as the semantic mask.

12. The device according to claim 9, wherein:
the GAN model includes multiple generators corresponding to multiple resolutions arranged in series from a lower resolution to a higher resolution; and
generating the image using the GAN model comprises:
determining, using a first generator, a first image and first hidden features according to the modified sentence feature vector of the text and the semantic mask down-sampled to a first resolution; and
determining, using an i-th generator according to (i−1) th hidden features determined by an (i−1) th generator and the semantic mask having an i-th resolution, an i-th image having the i-th resolution and i-th hidden features, wherein i is an integer greater than 1.

13. The device according to claim 12, wherein:
the text feature vector further includes a word feature vector obtained according to each word in the text; and
the i-th image is determined by the i-th generator according to the word feature vector.

14. A non-transitory computer readable storage medium, storing computer instructions that, when being executed by a processor, causes the processor to perform a plurality of operations comprising:
obtaining a text describing a content of an image to be generated;
extracting, using a text encoder, a text feature vector from the text, the text feature vector including a sentence feature vector describing a global feature of a whole sentence of the text;
obtaining a modified sentence feature vector of the text by concatenating the sentence feature vector and a random latent vector;

determining a semantic mask as spatial constraints of the image to be generated; and
automatically generating the image using a generative adversarial network (GAN) model according to the semantic mask and the text feature vector,
wherein determining the semantic mask as the spatial constraints comprises:
before using the GAN model, automatically determining, by a trained self-attention generator according to the modified sentence feature vector, the semantic mask as the spatial constraints of the image to be generated, wherein the self-attention generator is trained based on a first training data set that includes training texts and target semantic maps obtained from original images corresponding to the training texts, and the trained self-attention generator is configured to generate, using a modified sentence feature vector extracted from a training text of the training texts as input, a candidate semantic mask closest to the target semantic map corresponding to the training text.

15. The storage medium according to claim 14, wherein the semantic mask is a binary image describing a shape of the content.

16. The storage medium according to claim 14, wherein:
the GAN model includes multiple generators corresponding to multiple resolutions arranged in series from a lower resolution to a higher resolution; and
generating the image using the GAN model comprises:
determining, using a first generator, a first image and first hidden features according to the modified sentence feature vector of the text and the semantic mask down-sampled to a first resolution; and
determining, using an i-th generator according to (i−1) th hidden features determined by an (i−1) th generator and the semantic mask having an i-th resolution, an i-th image having the i-th resolution and i-th hidden features, wherein i is an integer greater than 1.

17. The storage medium according to claim 16, wherein:
the text feature vector further includes a word feature vector obtained according to each word in the text; and
the i-th image is determined by the i-th generator according to the word feature vector.

* * * * *